United States Patent
Lin

(10) Patent No.: US 10,742,293 B2
(45) Date of Patent: Aug. 11, 2020

(54) CHANNEL STATE FEEDBACK WITH NETWORK DOWN SELECTION ALTERNATIVES

(71) Applicant: QUALCOMM Incorporated, San Diego, CA (US)

(72) Inventor: Jamie Menjay Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/176,925

(22) Filed: Oct. 31, 2018

(65) Prior Publication Data
US 2019/0132037 A1    May 2, 2019

Related U.S. Application Data

(60) Provisional application No. 62/580,941, filed on Nov. 2, 2017.

(51) Int. Cl.
| | |
|---|---|
| H04B 7/06 | (2006.01) |
| H04B 7/0456 | (2017.01) |
| H04B 17/309 | (2015.01) |
| H04W 48/18 | (2009.01) |

(Continued)

(52) U.S. Cl.
CPC ......... *H04B 7/0626* (2013.01); *H04B 7/0473* (2013.01); *H04B 7/0486* (2013.01);
(Continued)

(58) Field of Classification Search
CPC .. H04B 7/0634; H04B 7/0665; H04B 7/0456; H04B 7/0486; H04B 7/061
See application file for complete search history.

(56) References Cited

U.S. PATENT DOCUMENTS

| | | |
|---|---|---|
| 9,813,939 B1 | 11/2017 | Marupaduga et al. |
| 9,985,763 B2 | 5/2018 | Yang et al. |

(Continued)

FOREIGN PATENT DOCUMENTS

| | | |
|---|---|---|
| WO | WO-2017048048 A1 | 3/2017 |
| WO | WO-2018027908 A1 | 2/2018 |
| WO | WO-2018027994 A1 | 2/2018 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP Draft; 36300-E40, 3rd Generation Partnership Project (3GPP), Mobile Competence Centre; 650, Route Des Lucioles; F-06921 Sophia-Antipolis Cedex; France, Sep. 26, 2017, XP051354064, Retrieved from the Internet: URL:http://www.3gpp.org/ftp/tsg_ran/WG2_RL2/Specifications/201709_final_specs_after_RAN_77/ [retrieved on Sep. 26, 2017], 329 pages.

(Continued)

*Primary Examiner* — Kevin Kim
(74) *Attorney, Agent, or Firm* — Arent Fox, LLP

(57) ABSTRACT

The various aspects include transmitting, by a transceiver of the wireless communications device, an indication of a primary service preference for a primary service and a secondary service preference for a secondary service, receiving, by the transceiver, a radio access technology support configuration from the network at least in part in response to the transmitted indication of the primary service preference and the secondary service preference, and supporting the primary service or the secondary service based at least in part on the channel layer configuration. In this manner, the wireless communications device provides the network with multiple ranked service preferences, so that if a network down selection is needed, the network may select (Continued)

a lower ranked service preference rather than generating a channel layer configuration without knowledge of which settings are most efficient for the wireless communications device.

40 Claims, 13 Drawing Sheets

(51) Int. Cl.
    *H04W 72/06*     (2009.01)
    *H04L 5/00*     (2006.01)
    *H04B 17/382*     (2015.01)
    *H04W 72/04*     (2009.01)

(52) U.S. Cl.
    CPC ........... *H04B 7/061* (2013.01); *H04B 17/309* (2015.01); *H04B 17/382* (2015.01); *H04L 5/00* (2013.01); *H04W 48/18* (2013.01); *H04W 72/06* (2013.01); *H04B 7/0639* (2013.01); *H04W 72/0406* (2013.01)

(56) References Cited

U.S. PATENT DOCUMENTS

| | | |
|---|---|---|
| 2012/0270535 A1 | 10/2012 | Chen et al. |
| 2018/0070369 A1 | 3/2018 | Papasakellariou |
| 2018/0254814 A1 | 9/2018 | Park et al. |
| 2018/0324007 A1* | 11/2018 | Nammi ............. H04L 25/03929 |
| 2019/0132031 A1* | 5/2019 | Park ..................... H04B 7/0456 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification ( Release 13)", 3GPP Standard; Technical Specification; 3GPP TS 36.331, 3rd Generation Partnership Project (3GPP), Mobile Competence Centre; 650, Route Des Lucioles; F-06921 Sophia-Antipolis Cedex; France, vol. RAN WG2, No. V13.7.1, Sep. 29, 2017, XP051337498, [retrieved on Sep. 29, 2017], pp. 1-642.

"3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP Standard; Technical Specification; 3GPP TS 23.401, 3rd Generation Partnership Project (3GPP), Mobile Competence Centre; 650, Route Des Lucioles; F-06921 Sophia-Antipolis Cedex; France, vol. SA WG2, No. V15.1.0, Sep. 18, 2017, XP051336975, pp. 1-397.

International Search Report and Written Opinion—PCT/US2018/058274—ISA/EPO—Jan. 9, 2019.

\* cited by examiner

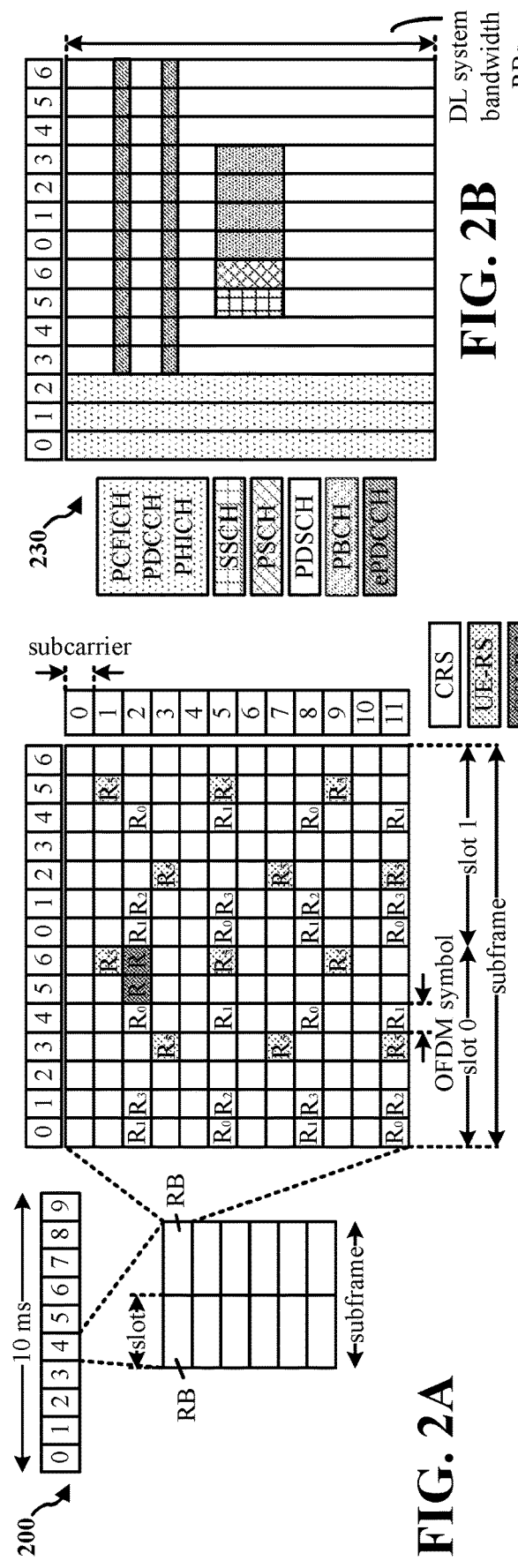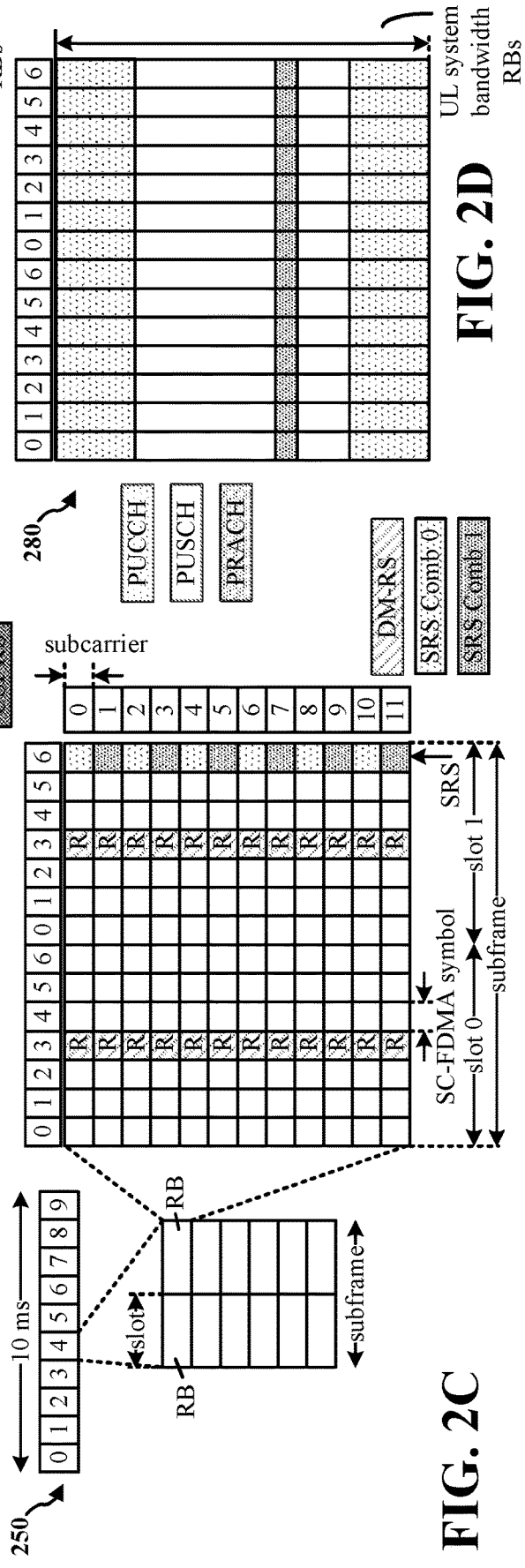
FIG. 2A
FIG. 2B
FIG. 2C
FIG. 2D

CHANNEL STATE FEEDBACK WITH NETWORK DOWN SELECTION ALTERNATIVES

CROSS-REFERENCE TO RELATED APPLICATION

The current application claims priority to U.S. Provisional Application No. 62/580,941 filed on Nov. 2, 2017, entitled "Network Down Selection Using Channel State Feedback," the content of which is incorporated by reference in its entirety.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies. Multiple access technologies may also be adopted in other standards, such as 5G/New Radio (NR).

In wireless communications networks, channel state information (CSI) is known channel properties of a communication link. Exchanging this information between receivers and transmitters may enable network components to adapt transmissions to current channel conditions. Such transmission adaptability is crucial for achieving reliable communication with high data rates in multi-antenna UE.

The CSI information describes how a signal propagates from the transmitter to the receiver and may further include the combined effect of scattering, fading, and power decay with distance. CSI may generally be estimated by the receiver, quantized, optionally analyzed, and then transmitted back to the transmitter. The transmitter may use the received CSI to assign network resources such as channel layers to antennas of the receiver (e.g., UE).

When current network channel capacity is insufficient to support existing users and a channel layer request of a UE, then the transmitter may "down select". Down selection includes the assignment by the transmitter of fewer resources than requested by the receiver. The various aspects provide methods and wireless communication devices that may mitigate the resource inefficiency issues present in prior solutions. Various aspects may improve utilization of available physical resources, increase signaling reliability, and/or data transfer efficiency. This may improve the performance of certain classes of services supported by the RATs assigned to the various antennas of the UE, thereby improving the overall end user experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The number of antennas in UE continues to increase along with support for simultaneous RATs (e.g., 3G/LTE/NR, millimeter wave (MMW), Wireless Fidelity (Wi-Fi), unlicensed LTE/NR, etc.) for modern UEs, each of which requires use of at least a subset of antenna components. Some antenna components and transceiver processing parts may be shared. The rise in complexity of radio access technology (RAT) switching and antenna load balancing results in inefficient use of physical UE resources and a lack of network signaling reliability. Such problems may arise as a result of network down grading or down selection. This occurs when a network denies a UE request for network resources to support UE antennas or subcomponents and instead assigns a lesser number of resources without knowledge of the UE's preferred antenna configuration. The result is often an assignment that is does not efficiently utilize UE antennas or subcomponents, thereby wasting UE power and processing resources.

The various aspects provide methods and wireless communication devices that may mitigate the resource inefficiency issues present in prior solutions. Various aspects include storing two or more service preferences, each service preference including at least a PMI and desired number of layers of a network channel for use in supporting communications of antennas of the wireless communications device. When a UE requests network resources, it may transmit an indication as to its primary service preference and one or more backup (e.g., secondary, tertiary) service preferences. Providing the network with recommendations for down grading/down selection may increase the likelihood that the UE will obtain a configuration assignment favorable to the UE, even if the assignment is not the primary service preference. Thus, even if the network does not adopt the primary service preference, the UE may still obtain an assignment that it knows to be sub-optimal but still resource efficient, because the UE made the request. The various aspects may improve UE resource usage, signaling reliability, and service support by providing a network with knowledge of the UE's preferred configuration for supporting services via one or more RATs In an aspect of the disclosure, a method, a computer-readable medium, and an apparatus are provided. The steps for network down selection may include transmitting, by a transceiver of the wireless communications device, an indication of a primary service preference for a primary service and a secondary service preference for a secondary service, receiving, by the transceiver, a support configuration from the network at least in part in response to the transmitted indication of the primary service preference and the secondary service preference, and supporting the primary service or the secondary service based at least in part on the channel layer configuration. By enabling a UE to provide a network with an indication of ranked preference of channel layer configurations (e.g. service support preferences), the present disclosure provides a mechanism for networks to down select channel layer configurations that fit within network resource capabilities, but are still desirable to a supporting device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
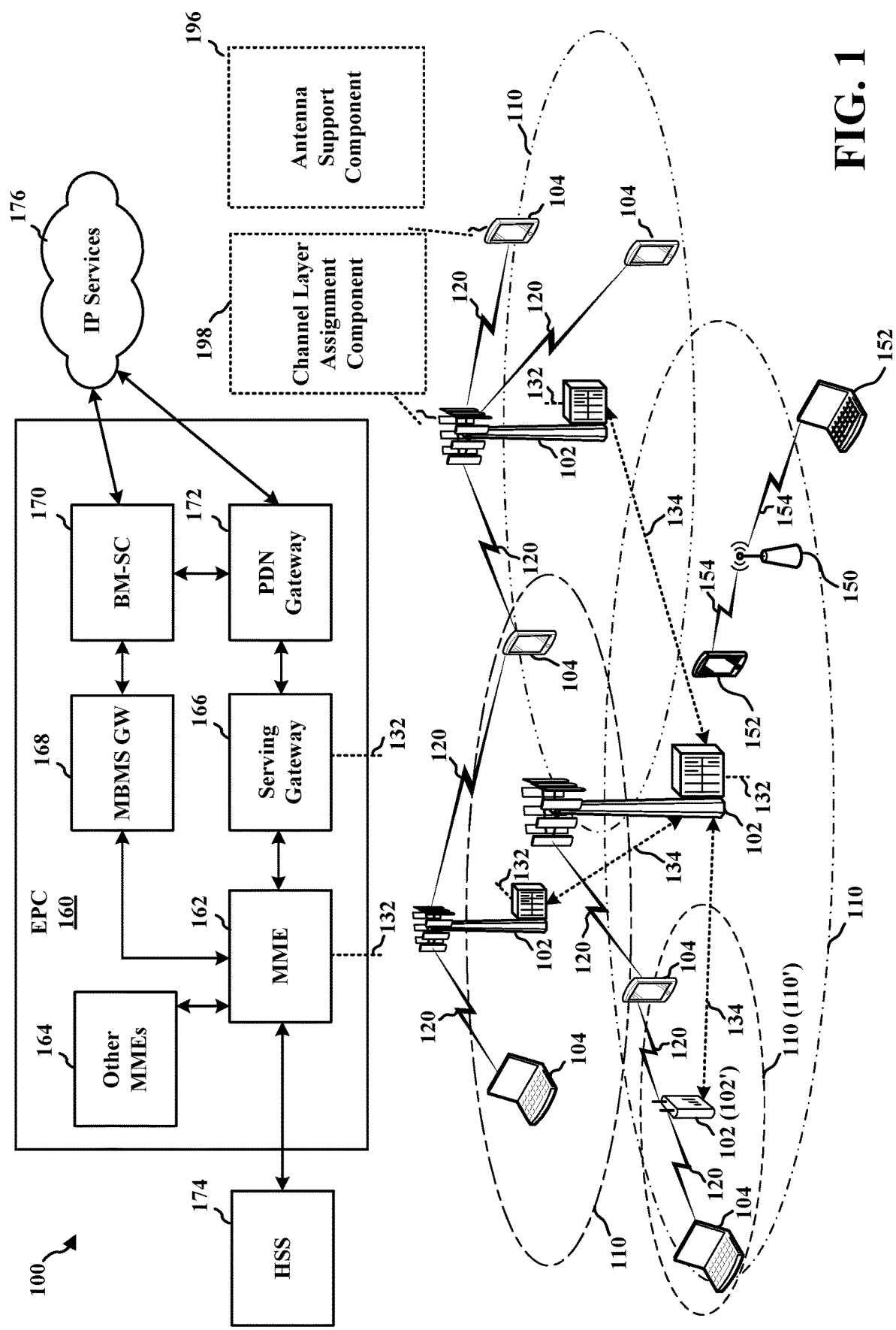
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless communications network will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Multi-antenna wireless communications devices enable data communications by supporting various services with one or more radio access technologies such as 3G, LTE, NR, Wi-Fi, Bluetooth, etc. Antennas or their subcomponents may be temporarily assigned to host data flows for a type of RAT in order to support services that require use of the data flow. The host antenna or antenna sub-component access a data stream also known as a "channel layer" of a wireless communications network in order to send and receive data according to the hosted RAT. Each channel layer is mapped to an antenna or antenna subcomponent of the wireless communications device according to a pre-coding Matrix indicator (PMI). Often, multiple antennas of a wireless communications device will support a single RAT in order to improve data throughput, making proper mapping of antennas to channel layers important to avoid data loss. However, wireless communications devices are assigned their channel layer configuration, number of accessible layers and associated PMIs by the network, and may have only limited input into the assigned channel layer configuration.

In wireless communications networks, the channel state information feedback mechanism is defined such that UE takes measurements of a perceived channel, which is a collection of data streams, and reports as a feedback back to the network. Various transmission modes and various CSI reporting (feedback) types are defined in LTE and NR. In the defined procedures for UE measurements and reporting, the UE reports the CSI based on its "preferred" configurations, e.g., pre-coding matrix indicator, channel quality, channel quality indicator (CQI), and rank indicator (RI) based on its perceived channel.

CSI measurements performed by the UE may be based on "best-scenario" operation of the channel and configuration of the antenna components. As such, the UE reports such CSI feedback as its "preferred" or "recommended" operation/configuration based on the channel and antenna components, hoping that the network could "honor" such preference or recommendation. However, such preference or recommendation by the UE may not be honored, because the network must balance the capacity needs of current users and the network typically needs to optimize for the majority of UEs of the cell. If the preference/recommendation of the UE is not honored by the network, the network may "down grade" or "down select" the offered service from the UE preferred or recommended. For example, an UE prefers and reports layers of 4, but the network allocates only layers of 2 to that UE. In further example, when the network does not honor the preferred and reported CSI by the UE, the network may then choose some other configurations (say, layers of 2 and certain PMI "x") that is not preferred by the UE and also is not optimal to the UE. Similarly, the UE may have preferred/recommended a configuration (e.g., PMI "y" for layers of 2) different from the configuration the network actually assigns. (e.g., PMI "x !=y" for layers of 2). Thus, arbitrary resource configuration assignment by the network to a UE may result in wasted or inefficient use of antenna resources.

Another problem results from the need to support multiple RATs simultaneously in modern UE (e.g., simultaneous NR and Wi-Fi, or simultaneous licensed NR and unlicensed [shared-spectrum] LTE, etc.). For example, a UE may have 4 or more usable antennas, while engaging 2 antennas for NR, and the other 2 for Wi-Fi or unlicensed LTE. The UE may optimize for the best selection of antenna subset to use for NR, and the complement subset of antennas for another RAT. The UE may prefer a layer of 4 to support just NR or a layer or 2 for NR and a layer of 2 for another RAT, according to channel state measurements. Either of these may be requested of the network by recommendation or preference. If the UE does not receive it's recommended or preferred configuration its only recourse is to continue reporting CSI measurements and requesting a recommended/preferred configuration.

After reporting, the UE may wait to find out whether its preference will be granted, while implementing whatever configuration the network assigns. In practical cases, when the network actually grants only 2 layers to the UE, the PMI chosen by the network is usually not optimal to the UE. More particularly, if the UE requested 4 layers, but the network only assigns 2 layers, then the UE has initiated 4 antennas to support a RAT, but instead gets only 2 layers worth of capacity. This too may result in a waste of physical resource and a degradation of achieved service.

The various aspects provide methods and wireless communication devices that may mitigate the resource inefficiency issues present in channel layer assignments. Various aspects may improve utilization of available physical resources, increase signaling reliability, and/or data transfer efficiency. This may improve the performance of certain classes of services supported by the RATs assigned to the various antennas of the UE, thereby improving the overall end user experience.

FIG. 1 is a diagram illustrating an example of a wireless communications system and an access network 100. The wireless communications system 100 (also referred to as a wireless wide area network (WWAN)) includes base stations 102, UEs 104, and an Evolved Packet Core (EPC) 160 or a Fifth Generation Core (5GC) 190. The base stations 102 may include macro cells (high power cellular base station) and/or small cells (low power cellular base station). The macro cells include eNBs. The small cells include femtocells, picocells, and microcells. The wireless communications system 100 is configured to support network down selection using channel state feedback.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 102 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 102 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some non-limiting examples, the base stations 102 may interface with the 5GC 190 through backhaul links 136. The 5GC 190 may include one or more Access and Mobility Management Functions (AMFs), a Session Management Function (SMF), and a User Plane Function (UPF). The AMF may be in communication with a Unified Data Management (UDM). The AMF is the control node that processes the signaling between the UEs 110 and the 5GC 190. Generally, the AMF provides QoS flow and session management. All user Internet protocol (IP) packets are transferred through the UPF. The UPF provides UE IP address allocation as well as other functions. The UPF is connected to the IP Services. The IP Services may include the Internet, an intranet, an IP Multimedia Subsystem (IMS), a PS Streaming Service, and/or other IP services.

Referring again to FIG. 1, in certain aspects, the UE 104 may be configured to implement an antenna support component 196. The UE 104 may, via the antenna support component 196, perform regular channel state feedback reporting to the base station 102. The UE may, along with the report, request a preferred number of channels layers (e.g., antenna access) to the network in order to support one or more radio access technologies required to support device services.

In various aspects the base station 102 may be configured to implement a channel layer assignment component 198. The base station 102 may receive the request and review the received CSI feedback report. The base station may process the report and the request and may determine whether the network can honor/adopt the requested channel layer preferences based on current network usage and capacity data, and then transmit an assigned configuration to the UE 104.

The antenna support component 196 UE 104 may receive the assignment, in the form of a channel layer configuration, which indicates how many layers will be supported, and an accompanying pre-coding matrix indicator.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. The diagrams 200, 230, 250, and 280 may describe frame structures that can be used in connection with channel state feedback with network down selection alternatives. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator, a rank indicator, and HARQ ACK/NACK feedback. The PUSCH carries data, and may additionally be used to carry a buffer status report (BSR), a power headroom report (PHR), and/or UCI.

Figure 3:
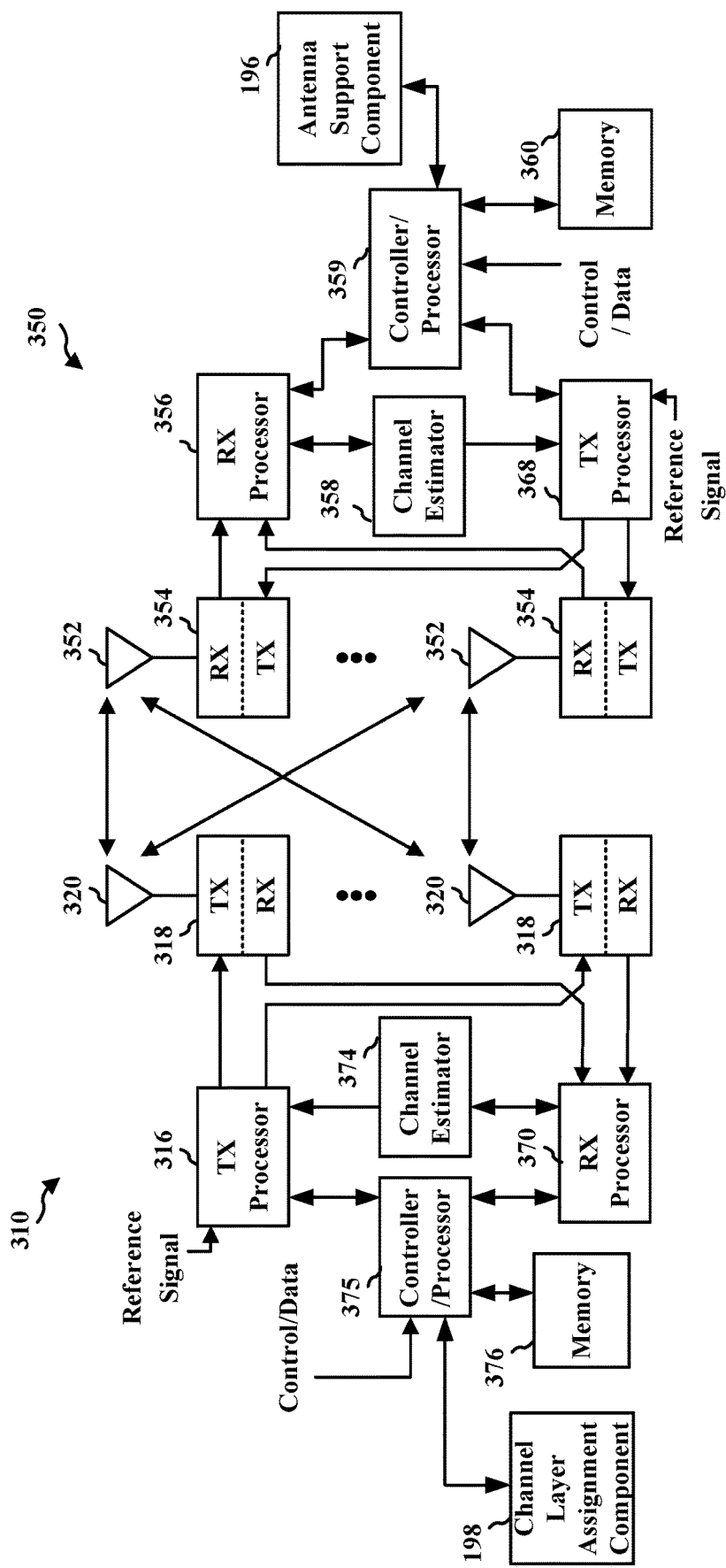
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Various aspects may include controller/processor 375 may include or be in communication with channel layer assignment component 198, which is described in greater detail with reference to FIG. 11. Various aspects may include controller/processor 359 may include or be in communication with antenna support component 196, which is described in greater detail with reference to FIG. 10.

Figure 4:
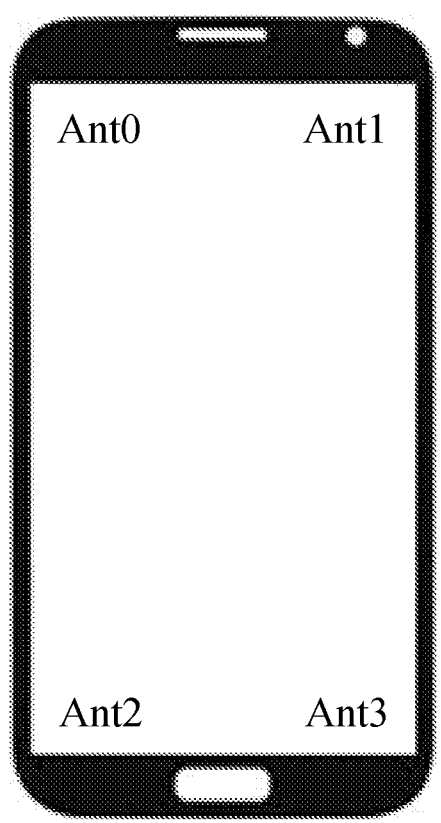
FIG. 4 is a diagram illustrating an example of a wireless communications device (UE) having multiple antennas in accordance with various aspects.
Figure 4:

FIG. 4 is a block diagram of a smartphone 400 having multiple antennas. The smartphone 400 may be a wireless communications device (e.g., UE 104) and may have multiple antennas Ant0, Ant1, Ant2, and Ant3 positioned throughout the device. Optionally, and in order to minimize the impact of signal interference, the antennas may be positioned as far from each other as physically possible. Exemplary service preferences for the smartphone may include a primary preference of 4 layers (e.g., Ant0, Ant1, Ant2, Ant3) and a secondary preference of 2 layers (e.g., Ant1, Ant 3 for a first RAT and An0, Ant 2 for a second RAT). The primary service preference may be associated with support of NR on four antennas in order to stream video content or during video gameplay. The primary preference may include the rank indicator (e.g., number of preferred channel layers) and an associated PMI, antenna to channel layer mapping, for each requested layer. If the wireless communications network adopts the primary service preference then the wireless communications device may receive four layers of the channel, which may be used for scheduling data transmission and receipt, and these layers may be mapped to the antennas of the device according to the PMI expressed in the primary service preference.

However, if the wireless communications network does not adopt the wireless communications network may consider the secondary service preference. Continuing the example, an end user playing a video game on their wireless communications device may experience severe quality of service degradation if the four channel layers requested in the primary service preference are denied and the network assigns only a single channel layer of data access to support the NR, which may be best suited to host the video game. The wireless communications device may pre-determine that when four channel layers to support NR are not available, a combination of 2 channel layers supporting NR and two channel layers supporting LTE are sufficient to support the video game. The secondary service preference may include a request for two layers (e.g., rank indicator) for two antennas with associated PMIs, to host NR. In a separate or the same service preference, the wireless communications device may express a request for two additional channel layers and associated PMIs to host LTE. Thus, the wireless communications device may express a backup plan to the wireless communications network.

In various aspects, support of RATs that do not require management by the wireless communications network, such as Wi-Fi or Bluetooth. the data usage of hosting antennas may not need to measure CSI and report to the wireless communications network. Thus, in scenarios in which down selection occurs, the wireless communications device may host Wi-Fi or Bluetooth on unselected antennas.

Figure 5:
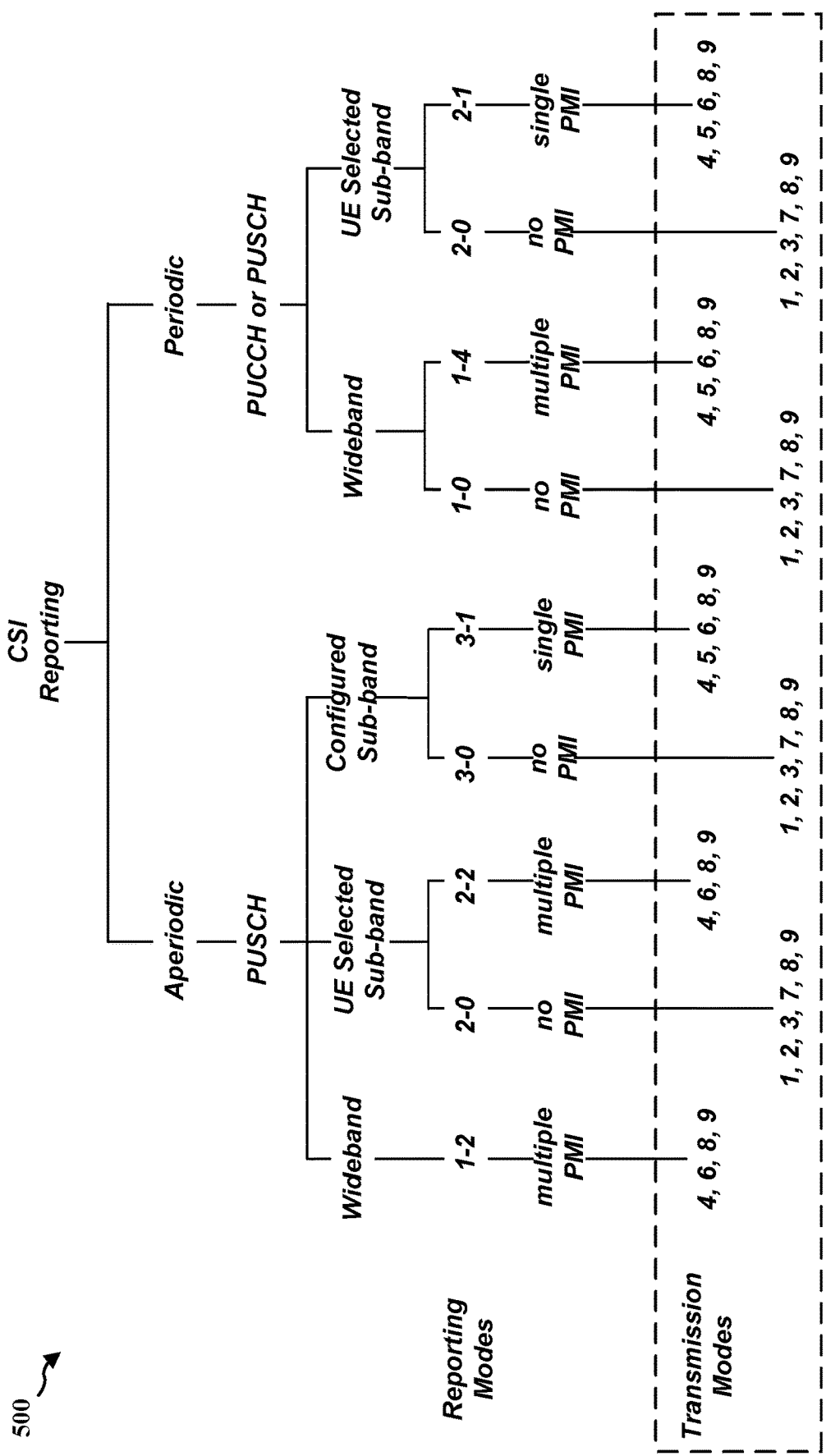
FIG. 5 is a hierarchy chart in accordance to the various aspects.
Figure 6:
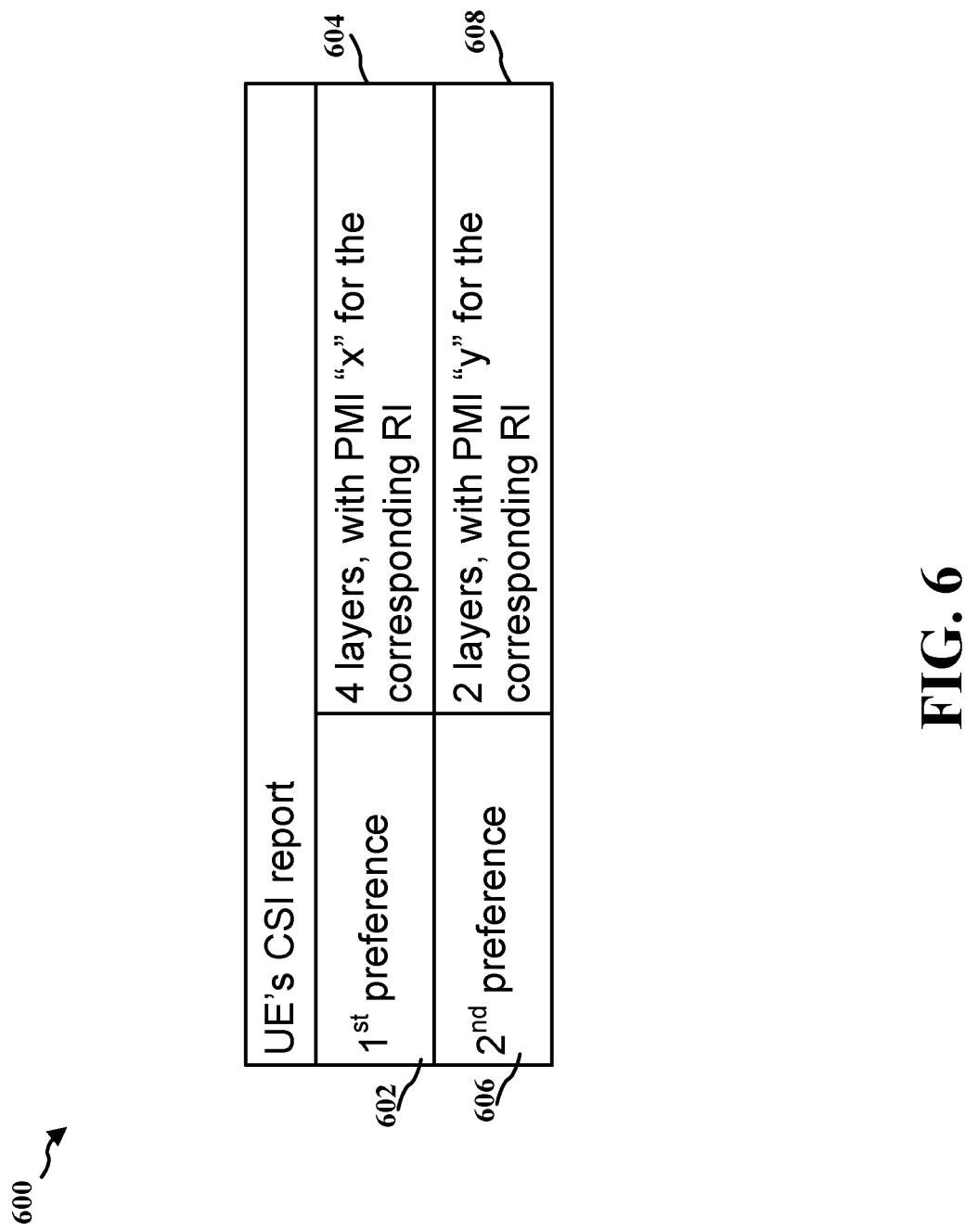
FIG. 6 is an exemplary table of stored service preferences in accordance with the various aspects.

FIG. 5 is a chart 500 illustrating various types of transmission modes and CSI reporting in a LTE network. The wireless communications device may periodically or aperiodically measure channel state information and report that information to the network. Transmission modes include no and single PMI states may be reported periodically, while transmission modes including no or multiple state PMI may be reported aperiodically. The wireless communications device may use the CSI measurements to select and rank service preferences from a stored set of configurations FIG. 6 is an exemplary data table 600 containing stored service preferences of the wireless communications device. The table 600 contains stored service preferences 604, 608 and an associated preference rank (e.g., rank indicator) 602, 606. The wireless communications device (e.g., UE 104) may review the measured CSI and may optionally select a PMI for one or more service preference based off the measure information. As shown in the FIG. 6, each service preference may be stored with a rank. However, the wireless communications device may override the stored or default ranking and may order the service preferences according to current network resource needs of services operating on the wireless communications device. Thus an indication of a primary service preference and a secondary service preference transmitted to the network, may be the default stored in the database, or may have a PMI not reflect the ranking as shown in the stored preference database.

Figure 7:
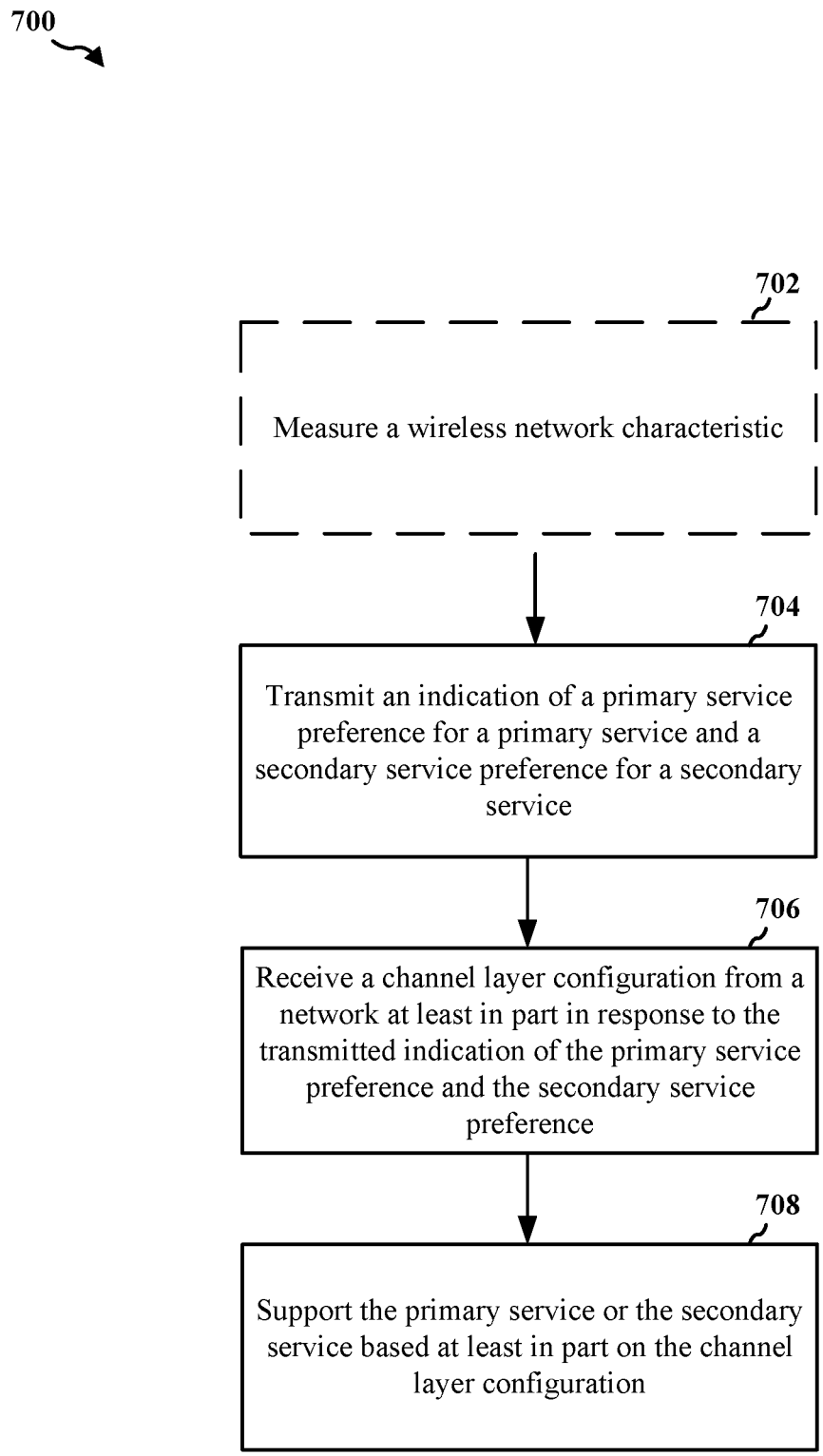
FIG. 7 is a flowchart of a method of wireless communications in accordance with the various aspects.

FIG. 7 illustrates an example of a method 700 for wireless communication network down selection according to the various aspects. With reference to FIGS. 1-7, the wireless communications device (e.g., UE 104) may communicate a plurality of preferred configurations for hosting one or more RATs on antennas of the wireless communications device to a network device (e.g., base station 102).

In block 702, a processor of the wireless communication device (e.g., controller/processor 359 in FIG. 3) may, via a measurement component (e.g. measurement component 806 in FIGS. 8 and 10), optionally measure a status characteristic of a network. For example, the status characteristic may include characteristics of a perceived channel of a long-term evolution (LTE) network with which the wireless communications device is in communication. A current state or value of a target characteristic may be measured periodically such as during channel state feedback (CSF), or alternatively may occur as needed by the wireless communications device.

In block 704, a transceiver (e.g., transceiver 1002 of FIG. 10) of the wireless communications device, via a transmission component, may transmit an indication of a primary service preference for a primary service and a secondary service preference for a secondary service. The service preferences transmitted to the network may be determined or selected based at least in part on the network status measurement. For example, the processor may, via the measurement component, or an independent selection component, review a set of stored service preferences (e.g., service preference table 600) and determine an order of preferences. Current channel status measurements such as channel quality indicators (CQI) and pre-coding matrix indicators may enable the wireless communications device to determine which mapping of channel layers to antenna components is best suited for a current service need. In various aspects, the wireless communications device may select a stored service preference to be the primary service preference and a second service preference to be the secondary service preference based on the measured network status characteristic, which may provide an indication of network resource availability. The transmission component may transmit an indication of the selected primary service preference and the secondary service preference to a network resource, in order to request a desired configuration for use of network resources. In some implementations, the transmission component may transmit the channel status measurements in a channel status information report to provide information, such as the CQI, to the network to help the network allocate resources.

In various aspects, transmitting the indication may include transmitting channel state information. The primary service preference may include a first pre-coding matrix indicator and a first rank indicator and the secondary service preference includes a second PMI and a second RI. In some configurations, the primary service preference may be associated with a first configuration of RATs and antennas of the wireless communications device; and the secondary service preference may be associated with a second configuration of RATs and antennas. The configuration of RATs to be supported on different antennas of the wireless communications device may differ across stored preferences. An exemplary primary service preference may be associated with a 4 layer, licensed LTE support request, while a secondary service request may be associated with a 2-layer licensed LTE request, which if honored would enable the de wireless communications device to utilize the remaining two antennas to support other RATs. In various aspects, each service preference may indicate a desired number of layers and the PMI. In some aspects the service preference may further indicate a channel quality indicator (CQI).

In various aspects, the wireless communications device may transmit a CSI report along with the indication of the primary service preference and the indication of the secondary service preference.

In some implementations, the transceiver (e.g., transceiver 1002 of FIG. 10) of the wireless communications device, via a transmission component, may transmit an indication of a primary service preference and one or more secondary service preferences having a number of PMIs and RIs.

In block 706, the transceiver of the wireless communications device may via a receiving component, receive a channel layer configuration from the network. The channel layer configuration received from the network may be based at least in part in response to the transmitted indication of the primary service preference and the secondary service preference. For example, the network may receive the primary and secondary service requests and evaluate network channel capacity to support the desired layers for one or more RATs. If current network channel capacity is sufficient to support current users and the layers requested by the primary service preference then the network may adopt the configuration associated with the primary service preference.

However, if current network channel capacity is insufficient to support existing users and the configuration associated with the primary service preference, then the network may "down select". Down selection includes the assignment by the network of fewer resources than requested by the wireless communications device. The down selection may be to the secondary service preference, a third service preference, or a network established resource configuration.

Thus, in various aspects, the received channel layer configuration may be a channel capacity adopted by the network, selected based, at least in part on network capacity and the transmitted primary service preference and the transmitted secondary service preference.

In block 708, the processor of the wireless communications device may, via a service support component, support the primary service or the secondary service based at least in part on the channel layer configuration. Supporting services may include assigning identified RATs to multiple antennas of the wireless communications device and then assigning a variety of services executing or queued for execution by the wireless communications device to the assigned RATs.

The various aspects include methods, systems, and devices for implementing those methods for enable network down selection based on wireless communications device RAT configuration preferences. The various methods may include transmitting, by a transceiver of the wireless communications device, an indication of a primary service preference for a primary service and a secondary service preference for a secondary service, receiving, by the transceiver, a radio access technology support configuration from the network at least in part in response to the transmitted indication of the primary service preference and the secondary service preference, and supporting a service based, at least in part on the channel layer configuration.

Some aspects may further include measuring, by a wireless communications device, a status characteristic of a network. In such aspects, measuring, by the wireless communications device, the status characteristic of a network may include measuring characteristics of a perceived channel of a long-term evolution (LTE) network.

In some aspects, transmitting, by the transceiver of the wireless communications device, the indication of the primary service preference and the secondary service preference may include transmitting channel state information, wherein the primary service preference includes a first pre-coding matrix indicator and a first rank indicator and the secondary service preference includes a second PMI and a second RI.

In some aspects, transmitting, by the transceiver of the wireless communications device, the indication of the primary service preference and the secondary service preference may be based at least in part on the network status measurement;

In some aspects, the primary service preference may be associated with a first configuration of RATs and antennas of the wireless communications device and the secondary service preference may be associated with a second configuration of RATs and antennas.

In some aspects, the channel layer configuration may be a channel capacity adopted by the network, selected based, at least in part on network capacity and the transmitted primary service preference and the transmitted secondary service preference.

In some aspects, the channel layer configuration may be a network down selection configuration.

In some aspects, supporting the service based, at least in part on the channel layer configuration may include assigning identified RATs to multiple antennas of the wireless communications device.

In some aspects, each indication of a service preference may include a number of channel layers and a PMI for the desired channel layers.

In some aspects, transmitting, by the transceiver of the wireless communications device, the indication of the primary service preference and the secondary service preference may include transmitting a first report with the indication of the primary service preference and a second report with the indication of the secondary service preference.

Various aspects may further include wireless communications devices, wireless communications devices having means for carrying out the above referenced method, as well as non-transitory processor-readable media having instructions for carrying out the above method.

Figure 8:
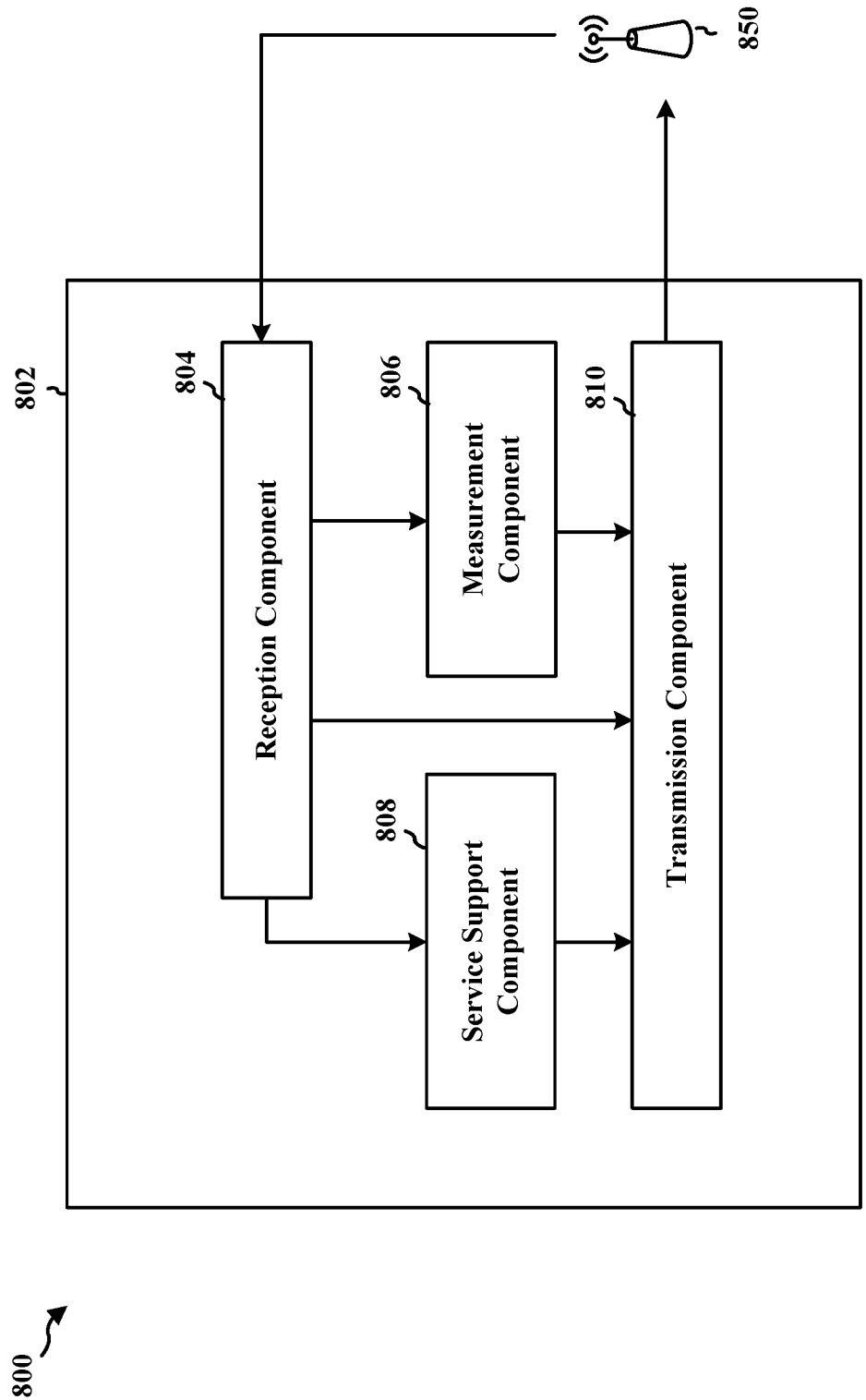
FIG. 8 is a conceptual data flow diagram illustrating the data flow between different means/components in an exemplary apparatus.

FIG. 8 is a conception flowchart 800 of a method of wireless communication. With reference to FIGS. 1-8 method 800 may be performed by a wireless communications device/network device (e.g., the UE 104/base station 102, the apparatus 802/902'). The apparatus 802 may have a set of components (e.g., antenna support component 196) that obtains network resource configuration from a network device such as an eNB 950 (e.g., base station 102).

A measurement component 806, of the wireless communications device may measure a status characteristic of a network channel linking the wireless communications device to an eNB 850. For example, the status characteristic may include characteristics of a perceived channel of a wireless communications network with which the wireless communications device is in communication. The measurement component may, via the measurement component, or an independent selection component, review a set of stored service preferences (e.g., service preference table 600) and determine an order of preferences. In various aspects, the wireless communications device may select a stored service preference to be the primary service preference and a second service preference to be the secondary service preference based on the measured network status characteristic, which may provide an indication of network resource availability.

In transmission component 810 (e.g. transmission component 810 in FIGS. 7 and 10), which may be coupled to or a component of the transceiver of the wireless communications device, may transmit an indication of a primary service preference and a secondary service preference. The transmission component may transmit an indication of the selected primary service preference and the secondary service preference to the eNB 850, in order to request a desired configuration for use of network resources.

In various aspects, the transmission component 810 may transmit channel state information. The primary service preference may include a first pre-coding matrix indicator and a first rank indicator and the secondary service preference includes a second PMI and a second RI. In some configurations, the primary service preference may be associated with a first configuration of RATs and antennas of the wireless communications device; and the secondary service preference may be associated with a second configuration of RATs and antennas. The configuration of RATs to be supported on different antennas of the wireless communications device may differ across stored preferences. An exemplary primary service preference may be associated with a 4 layer, licensed LTE support request, while a secondary service request may be associated with a 2-layer licensed LTE request, which if honored would enable the de wireless communications device to utilize the remaining two antennas to support other RATs. In various aspects, each service preference may indicate a desired number of layers and the PMI.

In reception component 808, which may be coupled to the transceiver or independent, the wireless communications device may receive a radio access technology (RAT) support configuration from the network. The channel layer configuration received from the network may be based at least in part in response to the transmitted primary service preference and the transmitted secondary service preference. In various aspects, the received channel layer configuration may be a channel capacity adopted by the network, selected based, at least in part on network capacity and the transmitted primary service preference and the transmitted secondary service preference.

In reception component 808 the service support component may support a service on a RAT based, at least in part on the channel layer configuration. Supporting services may include assigning identified RATs to multiple antennas of the wireless communications device and then assigning a variety of services executing or queued for execution by the wireless communications device to the assigned RATs.

Figure 9:
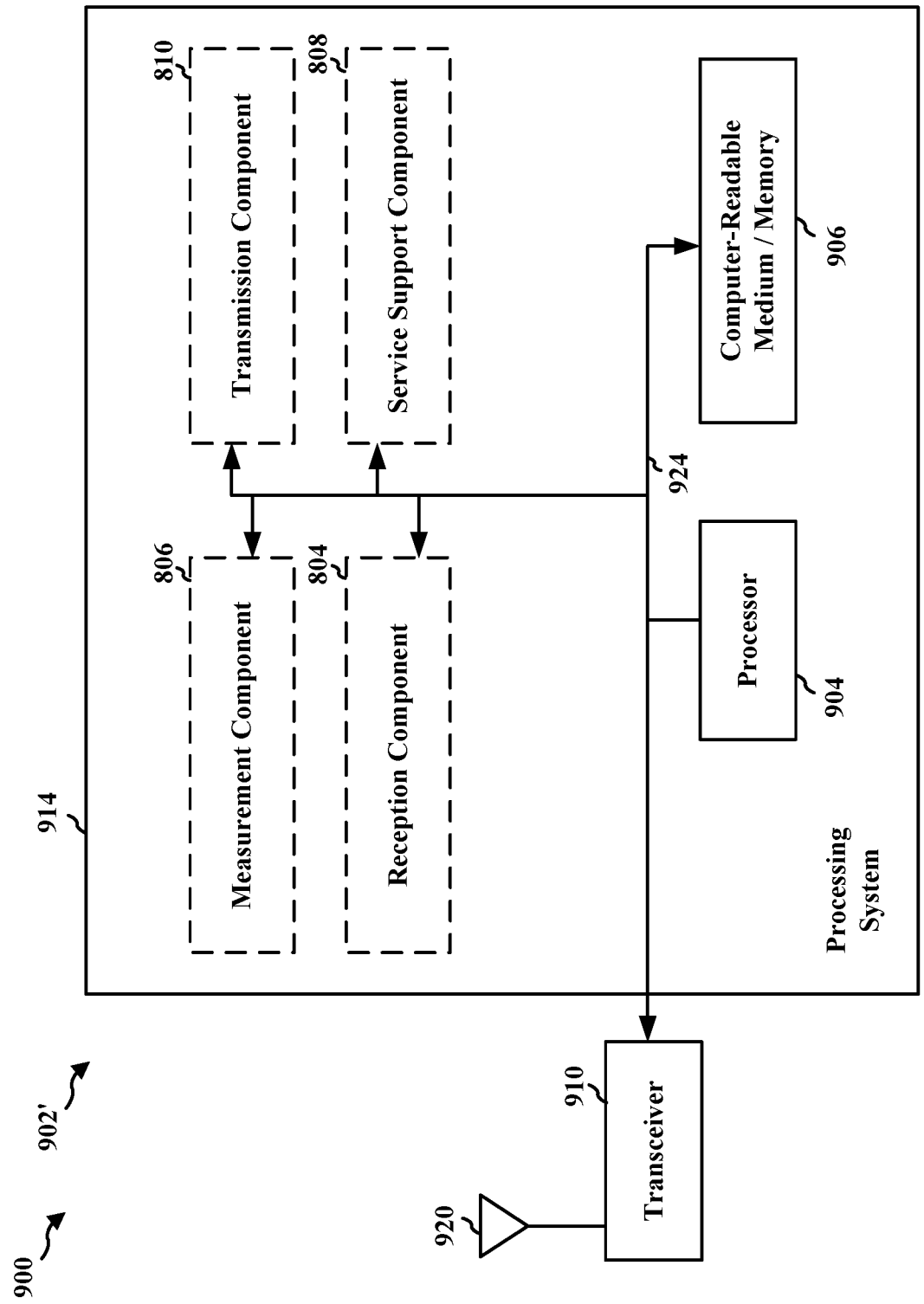
FIG. 9 is a diagram illustrating an example of a hardware implementation for an apparatus employing a processing system.

FIG. 9 is a diagram 900 illustrating an example of a hardware implementation for an apparatus 902' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/902' for wireless communication includes means for measuring a network status characteristic, transmitting an indication of a primary and secondary service preference, receiving a channel layer configuration, and supporting a service. The aforementioned means may be one or more of the aforementioned components of the apparatus 802 and/or the processing system 914 of the apparatus 902' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
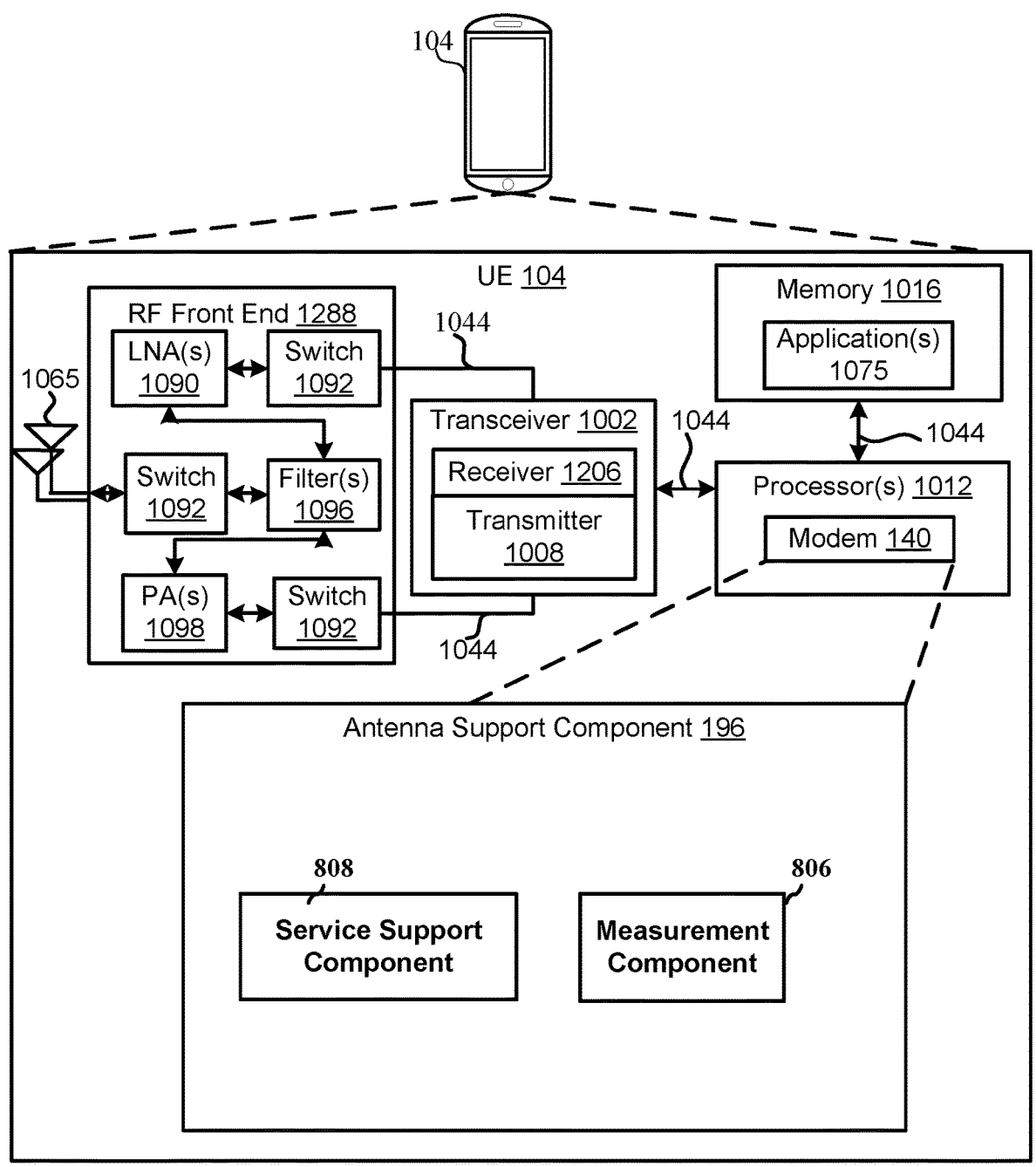
FIG. 10 is a schematic diagram of example components of the UE of FIG. 1.

Referring to FIG. 10, one example of an implementation of UE 104 may include a variety of components, some of which have already been described above, but including components such as one or more processors 1012 and memory 1016 and transceiver 1002 in communication via one or more buses 1044, which may operate in conjunction with modem 140 and Antenna support component 196 to enable one or more of the functions described herein related to providing multiple service preferences to a network base station Further, the one or more processors 1012, modem 1014, memory 1016, transceiver 1002, RF front end 1088 and one or more antennas 1086, may be configured to support voice and/or data calls (simultaneously or non-simultaneously) in one or more radio access technologies.

In an aspect, the one or more processors 1012 can include a modem 1014 that uses one or more modem processors. The various functions related to the antenna support component 196 may be included in modem 140 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 140 associated with antenna support component 196 may be performed by transceiver 1002.

Also, memory 1016 may be configured to store data used herein and/or local versions of applications 1275 or antenna support component 196 and/or one or more of its subcomponents being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be anon-transitory computer-readable storage medium that stores one or more computer-executable codes defining antenna support component 196 and/or one or more of its subcomponents, and/or data associated therewith, when UE 104 is operating at least one processor 1012 to execute antenna support component 196 and/or one or more of its subcomponents.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 102. Additionally, receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data, the code comprising instructions and being stored in a memory (e.g., computer-readable medium). A suitable example of transmitter 1008 may including, but is not limited to, an RF transmitter.

Moreover, in an aspect, UE 104 may include RF front end 1088, which may operate in communication with one or more antennas 1065 and transceiver 1002 for receiving and transmitting radio transmissions, for example, wireless communications transmitted by at least one base station 125 or wireless transmissions transmitted by UE 104. RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, RF front end 1088 can use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver may be tuned to operate at specified frequencies such that UE 104 can communicate with, for example, one or more base stations 105 or one or more cells associated with one or more base stations 102. In an aspect, for example, modem 140 can configure transceiver 1002 to operate at a specified frequency and power level based on the UE configuration of the UE 104 and the communication protocol used by modem 140.

In an aspect, modem 140 can be a multiband-multimode modem, which can process digital data and communicate with transceiver 1002 such that the digital data is sent and received using transceiver 1002. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 1088, transceiver 1002) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection As described supra, the UE 1000, may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
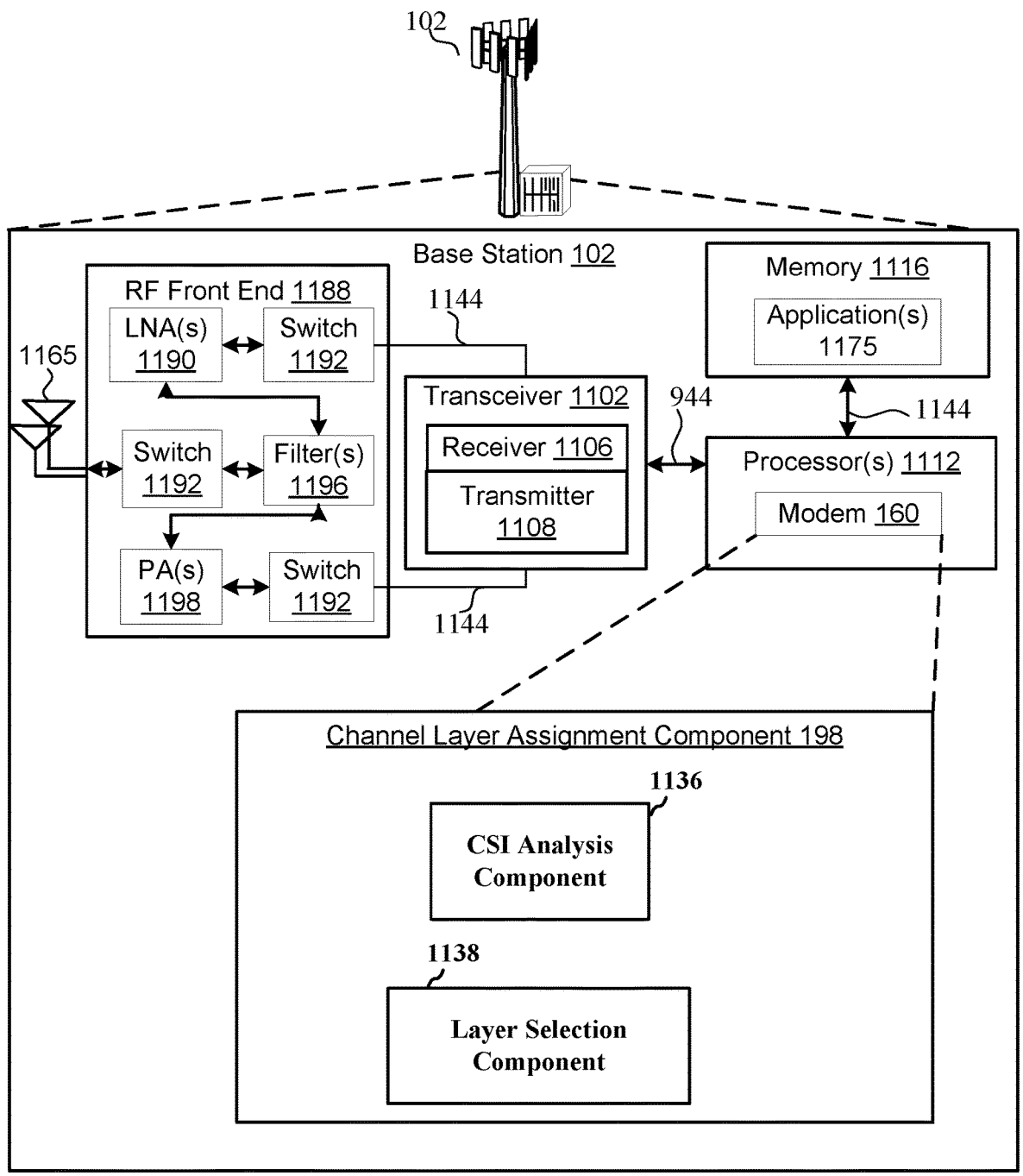
FIG. 11 is a schematic diagram of example components of the base station of FIG. 1.

Referring to FIG. 11, one example of an implementation of base station 102 may include a variety of components, some of which have already been described above, but including components such as one or more processors 1112 and memory 1116 and transceiver 1102 in communication via one or more buses 1144, which may operate in conjunction with modem 160 and channel layer assignment component 198 to enable one or more of the functions described herein related to assign channel layers to requesting UE based on current network status, a CSI report from the UE, and UE submitted service preferences.

The transceiver 1102, receiver 1106, transmitter 1108, one or more processors 1112, memory 1116, applications 1075, buses 1144, RF front end 1188, LNAs 1190, switches 1192, filters 1196, PAs 1198, and one or more antennas 1165 may be the same as or similar to the corresponding components of UE 104, as described with reference to FIG. 10, but configured or otherwise programmed for base station operations as opposed to UE operations.

The base station 102 may have a channel layer assignment component 198 having a number of sub components, which utilize components of processor(s) 112. The channel layer assignment component 198 may include a reception component 1132 configured to receive CSI reports and service preferences from a UE 104. The CSI report component 1136 may analyze the report to identify current characteristics of a channel. The layer selection component 1138 may review the received service preferences in light of the CSI report and current network usage information, and may determine an appropriate number of channel layers and a PMI to assign the requesting UE. This information may be transmitted by the transmission component 1134 to the requesting UE 104 in the form of a channel layer configuration.

As described supra, the base station 1100, may include the TX Processor 316, the RX Processor 356, and the controller/processor 359. As such, in one configuration, the aforementioned means may be the TX Processor 316, the RX Processor 370, and the controller/processor 375 configured to perform the functions recited by the aforementioned means. It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 12:
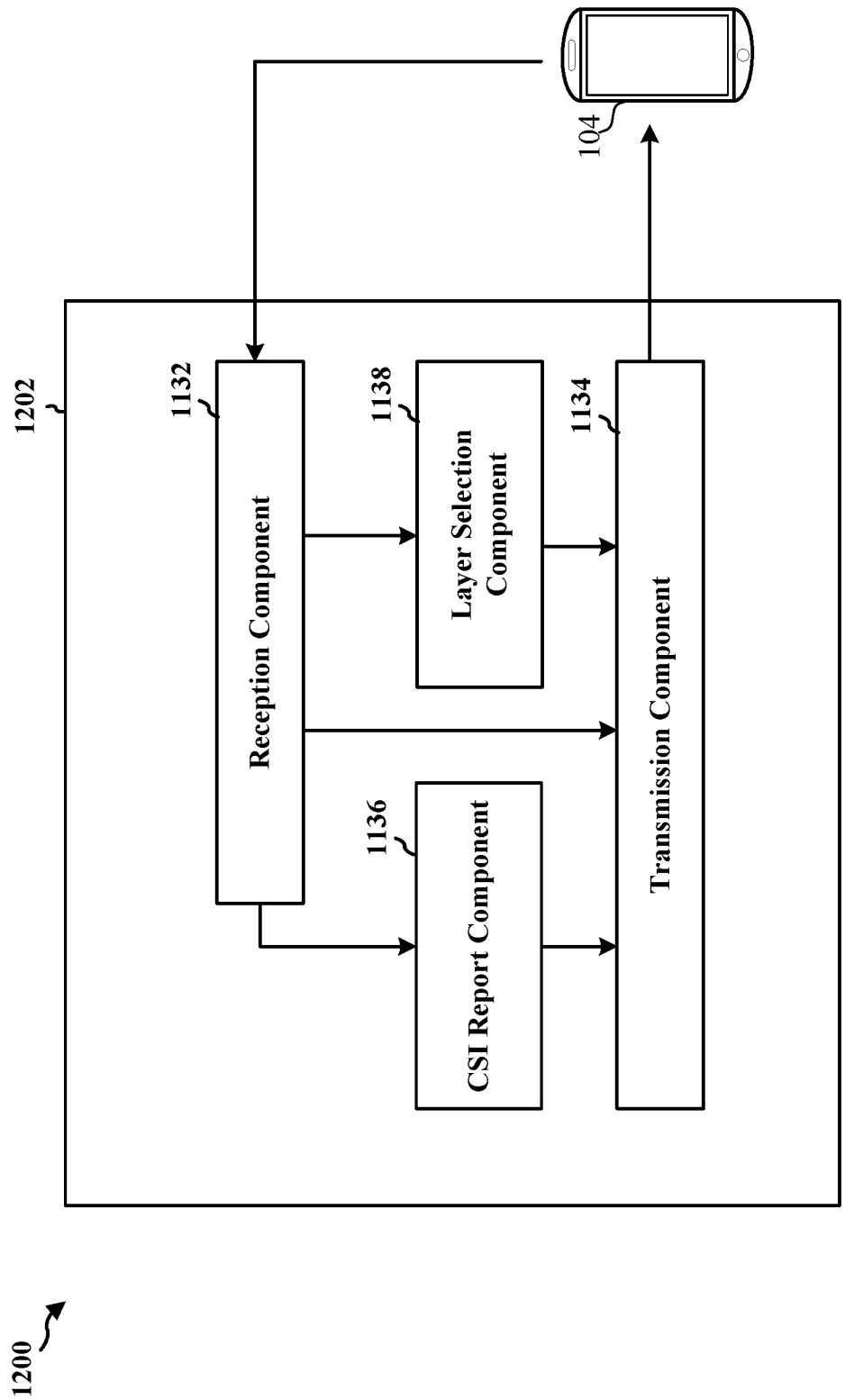
FIG. 12 is another conceptual data flow diagram illustrating the data flow between different means/components in an exemplary apparatus.

FIG. 12 is a conception flowchart 1200 of a method of wireless communication. With reference to FIGS. 1-7 and 12, method 1200 may be performed by a wireless communications device/network device (e.g., the base station 102, the apparatus 1202/1302'). The apparatus 1202 may have a set of components (e.g., channel layer assignment component 198) that assign channel layers to a network device such as an UE 104.

The reception component 1132 may be configured to receive CSI reports and service preferences from a UE 104.

The CSI report component 1136 may analyze the report to identify current characteristics of a channel. The layer selection component 1138 may review the received service preferences in light of the CSI report and current network usage information, and may determine an appropriate number of channel layers and a PMI to assign the requesting UE 104. This information may be transmitted by the transmission component 1134 to the requesting UE 104 in the form of a channel layer configuration.

Figure 13:
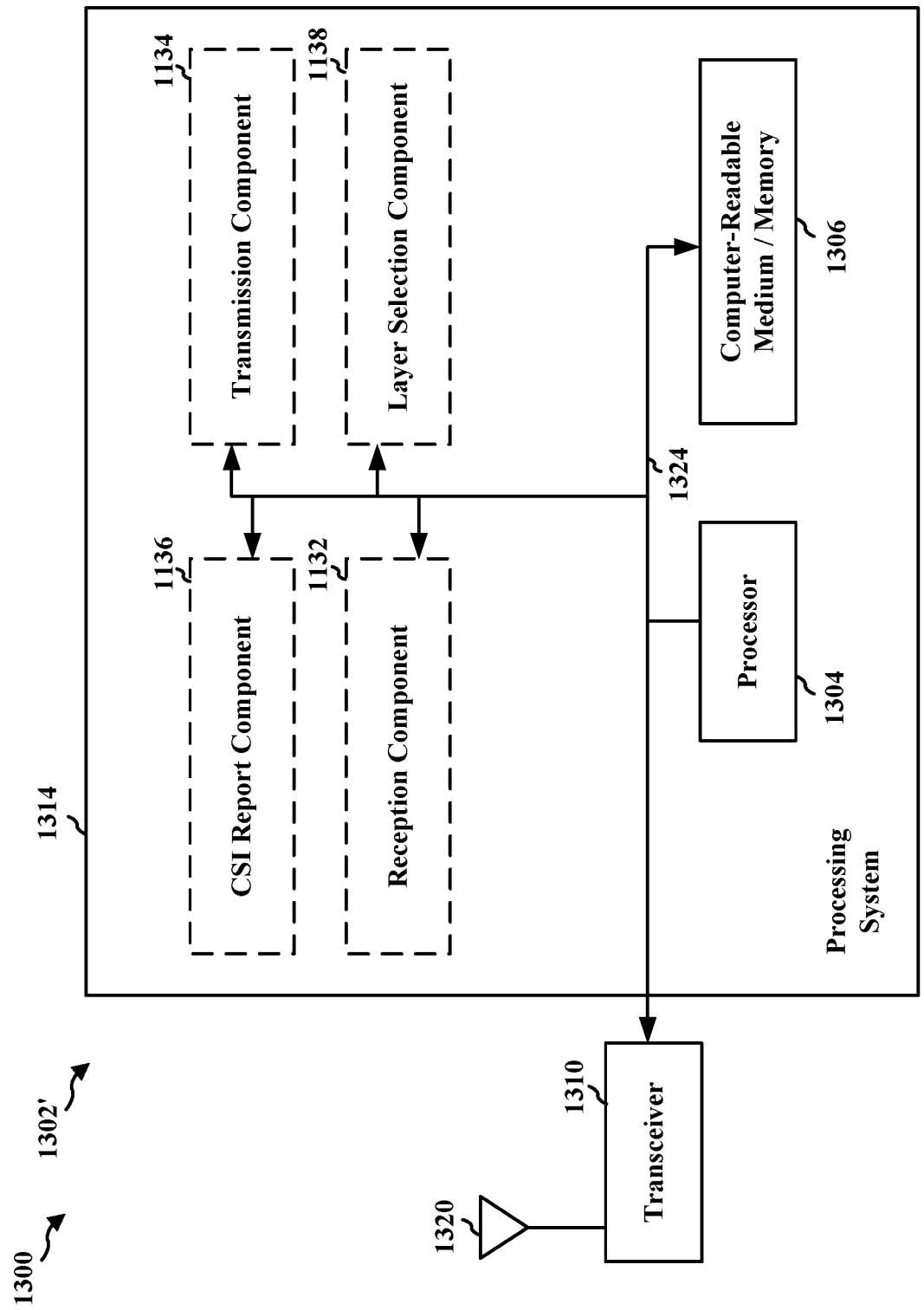
FIG. 13 is another diagram illustrating an example of a hardware implementation for an apparatus employing a processing system.

FIG. 13 is a diagram 1300 illustrating an example of a hardware implementation for an apparatus 1302' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1132, 1134, 1136, 1138 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1132. In addition, the transceiver 1310 receives information from the processing system 1314, specifically the transmission component 1134, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1132, 1134, 1136, 1138. The components may be software components running in the processor 1304, resident/stored in the computer readable medium/memory 1306, one or more hardware components coupled to the processor 1304, or some combination thereof. The processing system 1314 may be a component of the eNB 310 and may include the memory 376 and/or at least one of the TX processor 316, the RX processor 370, and the controller/processor 375.

In one configuration, the apparatus 1202/1302' for wireless communication includes means for measuring a network status characteristic, transmitting an indication of a primary and secondary service preference, receiving a channel layer configuration, and supporting a service. The aforementioned means may be one or more of the aforementioned components of the apparatus 1202 and/or the processing system 1314 of the apparatus 1302' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications network down selection, comprising:
    transmitting, by a transceiver of a wireless communications device, an indication of a primary service preference for a primary service and a secondary service preference for a secondary service, wherein the primary service preference is associated with a first configuration of one or more radio access technologies (RATs) and antennas of the wireless communications device and the secondary service preference is associated with a second configuration of the one or more RATs and the antennas of the wireless communications device;
    receiving, by the transceiver, a channel layer configuration from a network at least in part in response to the transmitted indication of the primary service preference and the secondary service preference; and
    supporting the primary service or the secondary service based at least in part on the channel layer configuration.

2. The method of claim 1, further comprising measuring, by the wireless communications device, a status characteristic of a channel associated with the network, wherein the primary service preference and the secondary service preference are based at least on part on the measured status characteristic of the network.

3. The method of claim 2, wherein measuring, by the wireless communications device, the status characteristic of the channel associated with the network comprises measuring characteristics of a perceived channel of a long-term evolution (LTE) network.

4. The method of claim 1, wherein transmitting, by the transceiver of the wireless communications device, the indication of the primary service preference and the secondary service preference comprises transmitting channel state information (CSI), wherein the primary service preference includes a first pre-coding matrix indicator (PMI) and a first rank indicator (RI) and the secondary service preference includes a second PMI and a second RI.

5. The method of claim 2, wherein transmitting, by the transceiver of the wireless communications device, the indication of the primary service preference and the secondary service preference is based at least in part on the measured status characteristic of the network.

6. The method of claim 1, wherein the channel layer configuration includes an indication of a channel capacity adopted by the network, selected based at least in part on a network capacity and the transmitted primary service preference and the transmitted secondary service preference.

7. The method of claim 1, wherein the channel layer configuration enables the network down selection configuration.

8. The method of claim 1, wherein supporting the primary service or the secondary service is based at least in part on the channel layer configuration comprises assigning identified RATs to multiple antennas of the wireless communications device.

9. The method of claim 1, wherein the indication of the primary service preference and the secondary service preference includes a number of channel layers and a PMI for the desired channel layers.

10. The method of claim 1, wherein transmitting, by the transceiver of the wireless communications device, the indication of the primary service preference and the secondary service preference comprises transmitting a network status information report along with the indication of the primary service preference and the secondary service preference.

11. A wireless communications device, comprising:
a transceiver;
a memory storing instructions; and
at least one processor coupled to the memory and the transceiver, and configured to execute the instructions to:
transmit, via the transceiver, an indication of a primary service preference for a primary service and a secondary service preference for a secondary service, wherein the primary service preference is associated with a first configuration of one or more radio access technologies (RATs) and antennas of the wireless communications device and the secondary service preference is associated with a second configuration of the one or more RATs and the antennas of the wireless communications device;
receive, via the transceiver, a channel layer configuration from a network at least in part in response to the transmitted indication of the primary service preference and the secondary service preference; and
support the primary service or the secondary service based at least in part on the channel layer configuration.

12. The wireless communications device of claim 11, wherein the at least one processor is further configured to measure a status characteristic of a channel associated with the network, wherein the primary service preference and the secondary service preference are based at least on part on the measured status characteristic of the network.

13. The wireless communications device of claim 12, wherein the at least one processor is further configured to the status characteristic of the channel associated with the network by measuring characteristics of a perceived channel of a long-term evolution (LTE) network.

14. The wireless communications device of claim 11, wherein the at least one processor is further configured to transmit he indication of the primary service preference and the secondary service preference by: transmitting channel state information (CSI), wherein the primary service preference includes a first pre-coding matrix indicator (PMI) and a first rank indicator (RI) and the secondary service preference includes a second PMI and a second RI.

15. The wireless communications device of claim 12, wherein the at least one processor is further configured to transmit the indication of the primary service preference and the secondary service preference based at least in part on the measured status characteristic of the network.

16. The wireless communications device of claim 11, wherein the channel layer configuration includes an indication of a channel capacity adopted by the network, selected based at least in part on a network capacity and the transmitted primary service preference and the transmitted secondary service preference.

17. The wireless communications device of claim 11, wherein the channel layer configuration enables the network down selection configuration.

18. The wireless communications device of claim 11, wherein the at least one processor is further configured such that supporting the primary service or the secondary service is based at least in part on the channel layer configuration comprises assigning identified RATs to multiple antennas of the wireless communications device.

19. The wireless communications device of claim 11, wherein the indication of the primary service preference and the secondary service preference includes a number of channel layers and a PMI for the desired channel layers.

20. The wireless communications device of claim 11, wherein the processor is further configured to transmit the indication of the primary service preference and the secondary service preference by: transmitting a network status information report along with the indication of the primary service preference and the secondary service preference.

21. A wireless communications device, comprising:
means for transmitting an indication of a primary service preference for a primary service and a secondary service preference for a secondary service, wherein the primary service preference is associated with a first configuration of one or more radio access technologies (RATs) and antennas of the wireless communications device and the secondary service preference is associated with a second configuration of the one or more RATs and the antennas of the wireless communications device;
means for receiving a channel layer configuration from a network at least in part in response to the transmitted indication of the primary service preference and the secondary service preference; and
means for supporting the primary service or the secondary service based at least in part on the channel layer configuration.

22. The wireless communications device of claim 21, further comprising means for measuring a status characteristic of a channel associated with the network, wherein the primary service preference and the secondary service preference are based at least on part on the measured status characteristic of the network.

23. The wireless communications device of claim 22, wherein the means for measuring the status characteristic of the channel associated with the network is configured for: measuring characteristics of a perceived channel of a long-term evolution (LTE) network.

24. The wireless communications device of claim 21, wherein the means for transmitting the indication of the primary service preference and the secondary service preference is configured to: transmitting channel state information (CSI), wherein the primary service preference includes a first pre-coding matrix indicator (PMI) and a first rank indicator (RI) and the secondary service preference includes a second PMI and a second RI.

25. The wireless communications device of claim 22, wherein transmitting the indication of the primary service preference and the secondary service preference is based at least in part on the measured status characteristic of the network.

26. The wireless communications device of claim 21, wherein the channel layer configuration includes an indication of a channel capacity adopted by the network, selected based, at least in part on a network capacity and the transmitted primary service preference and the transmitted secondary service preference.

27. The wireless communications device of claim 21, wherein the channel layer configuration enables the network down selection configuration.

28. The wireless communications device of claim 21, wherein the means for supporting the primary service or the secondary service is based at least in part on the channel layer configuration is configured for assigning identified RATs to multiple antennas of the wireless communications device.

29. The wireless communications device of claim 21, wherein the indication of the primary service preference and the secondary service preference includes a number of channel layers and a PMI for the desired channel layers.

30. The wireless communications device of claim 21, wherein the means for transmitting the indication of the primary service preference and the secondary service preference is configured to transmitting a network status information report along with the indication of the primary service preference and the indication of the secondary service preference.

31. A non-statutory computer-readable medium storing computer executable code executable by a processor of a wireless communications device, comprising code to:
  transmit an indication of a primary service preference for a primary service and a secondary service preference for a secondary service, wherein the primary service preference is associated with a first configuration of one or more radio access technologies (RATs) and antennas of the wireless communications device and the secondary service preference is associated with a second configuration of the one or more RATs and the antennas of the wireless communications device;
  receive a channel layer configuration from a network at least in part in response to the transmitted indication of the primary service preference and the secondary service preference; and
  support the primary service or the secondary service based at least in part on the channel layer configuration.

32. The non-statutory computer-readable medium of claim 31, further comprising code to measure a status characteristic of a channel associated with the network, wherein the primary service preference and the secondary service preference are based at least on part on the measured status characteristic of the network.

33. The non-statutory computer-readable medium of claim 32, wherein measuring the status characteristic of the channel associated with the network comprises measuring characteristics of a perceived channel of a long-term evolution (LTE) network.

34. The non-statutory computer-readable medium of claim 31, wherein transmitting the indication of the primary service preference and the secondary service preference comprises: transmitting channel state information (CSI), wherein the primary service preference includes a first pre-coding matrix indicator (PMI) and a first rank indicator (RI) and the secondary service preference includes a second PMI and a second RI.

35. The non-statutory computer-readable medium of claim 32, wherein transmitting the indication of the primary service preference and the secondary service preference is based, at least in part on the measured status characteristic of the network.

36. The non-statutory computer-readable medium of claim 31, wherein the channel layer configuration includes an indication of a channel capacity adopted by the network, selected based, at least in part on a network capacity and the transmitted primary service preference and the transmitted secondary service preference.

37. The non-statutory computer-readable medium of claim 31, wherein the channel layer configuration enables the network down selection configuration.

38. The non-statutory computer-readable medium of claim 31, wherein supporting the primary service or the secondary service is based at least in part on the channel layer configuration comprises assigning identified RATs to multiple antennas of the wireless communications device.

39. The non-statutory computer-readable medium of claim 31, wherein the indication of the primary service preference and the secondary service preference includes a number of channel layers and a PMI for the desired channel layers.

40. The non-statutory computer-readable medium of claim 32, wherein transmitting the indication of the primary service preference and the secondary service preference comprises: transmitting a network status information report along with the indication of the primary service preference and the secondary service preference.

* * * * *